(12) United States Patent
Keller et al.

(10) Patent No.: US 8,288,454 B2
(45) Date of Patent: *Oct. 16, 2012

(54) POLYMERIC COMPOSITIONS CONTAINING MICROSPHERES

(75) Inventors: Teddy M Keller, Fairfax Station, VA (US); Matthew Laskoski, Springfield, VA (US); Manoj K. Kolel-Veetil, Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 179 days.

This patent is subject to a terminal disclaimer.

(21) Appl. No.: 12/539,039

(22) Filed: Aug. 11, 2009

(65) Prior Publication Data

US 2011/0040028 A1 Feb. 17, 2011

(51) Int. Cl.
*C04B 28/26* (2006.01)
*C08K 5/01* (2006.01)
*C08G 77/56* (2006.01)
*C08G 77/12* (2006.01)

(52) U.S. Cl. ........ 523/218; 524/442; 524/495; 524/588; 526/279; 528/5; 528/25; 528/31; 556/431

(58) Field of Classification Search .................. 428/391; 528/25, 29, 5, 15, 31; 524/430, 445, 495, 524/496, 442, 588; 204/296; 526/279, 239; 556/403, 431, 433; 523/218
See application file for complete search history.

(56) References Cited

U.S. PATENT DOCUMENTS

| | | | |
|---|---|---|---|
| 4,663,388 A * | 5/1987 | Douglass et al. | 525/54.3 |
| 5,969,072 A * | 10/1999 | Keller et al. | 528/5 |
| 5,981,678 A * | 11/1999 | Keller et al. | 528/5 |
| 6,083,860 A * | 7/2000 | Matsuo et al. | 501/92 |
| 6,967,233 B2 | 11/2005 | Keller | |
| 7,087,707 B2 | 8/2006 | Keller et al. | |
| 7,238,766 B2 | 7/2007 | Keller et al. | |
| 7,723,420 B2 * | 5/2010 | Laskoski et al. | 524/430 |
| 2004/0084304 A1 * | 5/2004 | Thompson | 204/296 |
| 2006/0130609 A1 | 6/2006 | Keller et al. | |
| 2008/0255287 A1 | 10/2008 | Laskoski et al. | |
| 2009/0018273 A1 | 1/2009 | Keller et al. | |
| 2009/0069484 A1 | 3/2009 | Laskoski et al. | |
| 2009/0192272 A1 | 7/2009 | Laskoski et al. | |
| 2009/0281253 A1 * | 11/2009 | Okamoto et al. | 525/474 |
| 2010/0022693 A1 * | 1/2010 | Laskoski et al. | 524/430 |

OTHER PUBLICATIONS

Laskoski et al., U.S. Appl. No. 12/179,664, (May 2010).
Laskoski et al., "Direct conversion of highly aromatic phthalonitrile thermosetting resins into carbon nanotube containing solids" Polymer 48 (2007) 7484e7489.
Wouterson et al., "Specific properties and fracture toughness of syntactic foam: Effect of foam microstructures" Composites Science and Technology 65 (2005) 1840-1850.

* cited by examiner

*Primary Examiner* — Vasu Jagannathan
*Assistant Examiner* — Hannah Pak
(74) *Attorney, Agent, or Firm* — Amy L. Ressing; Joseph T. Grunkemeyer

(57) ABSTRACT

Disclosed herein is a composition having a thermoset polymer and a plurality of hollow microsphere homogenously dispersed in the composition. The polymer is a cyanate ester thermoset, a phthalonitrile thermoset, a crosslinked acetylene thermoset, or a hydrosilation thermoset. Also disclosed herein is a method of: providing a thermosetting compound; adding microspheres to the thermosetting compound; and mixing the thermosetting compound while initiating crosslinking of the thermosetting compound.

14 Claims, 5 Drawing Sheets

Divinyl- and diethynyl-terminated resins

Cyanate ester resins

POLYMERIC COMPOSITIONS CONTAINING MICROSPHERES

TECHNICAL FIELD

The present disclosure is generally related to polymeric compositions containing microspheres.

DESCRIPTION OF RELATED ART

The rapid advancement of modern technology in recent years has increasingly demanded new high performance materials for use in a wide variety of engineering applications and under unusual service conditions. High temperature, networked polymers that have thermal, thermo-oxidative, and hydrolytic stability at least to 500° C. and also maintain structural integrity to well below ambient temperature are in great demand for numerous aerospace and domestic applications.

Syntactic foams are composite materials consisting of hollow microspheres that are dispersed in a resinous matrix. These microspheres are commonly made from inorganic materials such as glass and silica and polymeric materials such as epoxy resin, unsaturated polyester resin, silicone resin, phenolics, polyvinylalcohol, polyvinyl chloride, polypropylene and polystyrene. Syntactic thermoset foams have received attention as low-density composites for a range of applications (Wouterson et al., *Comp. Sci. Tech.*, 65, 1840 (2005). All publications and patent documents referred to throughout this nonprovisional application are incorporated herein by reference). The matrices of these materials are generally thermosetting polymers. Inclusion of hollow microspheres dispersed in the thermoset resinous matrix reduces the density of the syntactic foams in a controlled manner. Improvements in foaming, production techniques and resulting properties of thermosetting foams have projected syntactic foams as the material of choice for general applications. These foams do not usually exhibit a melting range and can often be used at higher temperatures compared to thermoplastic foams. Unlike most other foams, syntactic foams are materials whose density before curing is the same as that after curing.

BRIEF SUMMARY

Disclosed herein is a composition comprising: a thermoset polymer selected from a cyanate ester (CE) thermoset, a phthalonitrile thermoset, a crosslinked acetylene thermoset, and a hydrosilation thermoset; and a plurality of hollow microsphere homogenously dispersed in the composition.

Also disclosed herein is a method comprising: providing a thermosetting compound selected from cyanate ester, phthalonitrile, acetylene containing compound, and hydrosilating compound; adding microspheres to the thermosetting compound; and mixing the thermosetting compound while initiating crosslinking of the thermosetting compound.

Also disclosed herein is a composition comprising: a compound selected from a cyanate ester, a phthalonitrile, an acetylene-containing compound, and a divinyl- or diethynyl-terminated compound; and a plurality of hollow microspheres.

BRIEF DESCRIPTION OF THE DRAWINGS

A more complete appreciation of the invention will be readily obtained by reference to the following Description of the Example Embodiments and the accompanying drawings.

DETAILED DESCRIPTION OF EXAMPLE EMBODIMENTS

Figure 1:
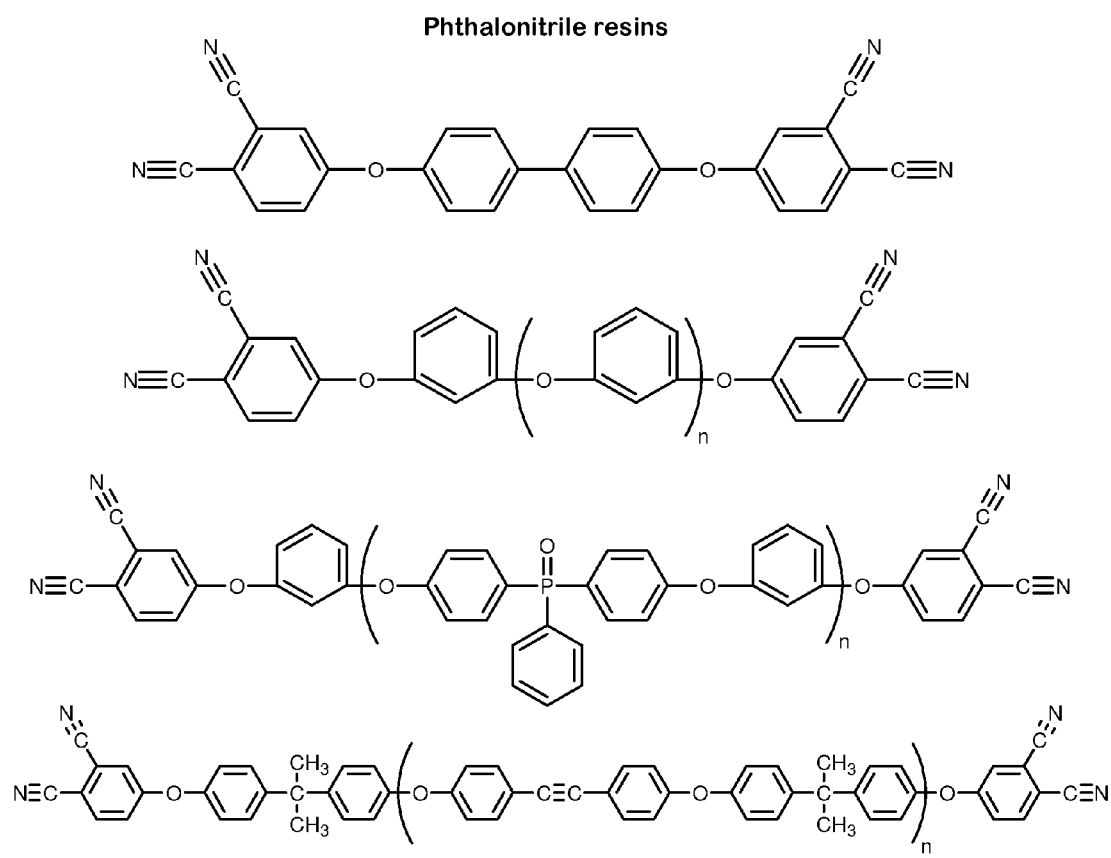
FIGS. 1 and 2 show examples of high temperature multiple aromatic ether resins.

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

The present disclosure is related to the formation of lightweight, easily processable, high temperature syntactic foams by the incorporation of microballoons (hollow microspheres) into polymer systems such as multiple aromatic ether containing resins and inorganic-organic hybrid resins/polymers and their thermal conversion into high temperature thermosetting coatings and high temperature thermosetting plastics, which have a large processing window for processability into shaped components. The precursor polymeric monomers have at least two sites (—OCN, vinyl, alkynyl, and/or phthalonitrile) for conversion to a networked system. The resulting lightweight syntactic foams are composite materials consisting of hollow microspheres that are dispersed in polymeric, carbon, and ceramic matrices. Dispersion of the microballoons/microspheres into the matrix material creates a porous material with closed cells.

One objective has been the incorporation of units within the backbone to enhance the flammability resistance and thermo-oxidative properties while retaining low temperature processability. A low melt viscosity resin enables composite processing by resin transfer molding (RTM) and resin infusion methods. Furthermore, a low melt viscosity and a larger processing window are useful for fabrication of thick composite sections where the melt has to impregnate shaped thick fiber preforms.

A variety of high temperature polymers have been developed for applications between 250 and 500° C. including the phthalonitriles, cyanate esters (CE), inorganic-organic hybrid polymers, and several divinyl terminated aromatic ether containing resins. Such polymers are disclosed in U.S. Pat. Nos. 3,730,946; 3,763,210; 3,787,475; 3,869,499; 3,972,902; 4,209,458; 4,223,123; 4,226,801; 4,234,712; 4,238,601; 4,259,471; 4,304,896; 4,307,035; 4,315,093; 4,351,776; 4,408,035; 4,409,382; 4,410,676; 5,003,039; 5,003,078; 5,004,801; 5,132,396; 5,159,054; 5,202,414; 5,208,318; 5,237,045; 5,242,755; 5,247,060; 5,292,854; 5,304,625; 5,350,828; 5,352,760; 5,389,441; 5,464,926; 5,925,475; 5,965,268; 6,001,926; 6,297,298; 6,891,014; 7,511,113; 7,452,959; and 6,756,470; and US Patent Application Publication Nos. 2009/0069484 and 2008/0255287 (phthalonitriles), U.S. Pat. Nos. 7,087,707; 7,348,395; 7,342,085 (cyanate esters); U.S. Pat. Nos. 6,787,615; 6,579,955; 6,967,233; 6,784,259; and 7,153,921 (acetylene polymers) and U.S. Pat. Nos. 7,238,766 and 7,449,535 and U.S. patent application Ser. Nos. 12/020,623; 12/179,664; and 12/427,084 (hydrosilation thermosets). The flammability, thermo-oxidative, and mechanical properties of polymeric materials may be altered by the incorporation of fillers and fibrous materials. The resulting coatings and composites can be used in marine and aerospace applications to enhance the structural integrity.

Figure 2:
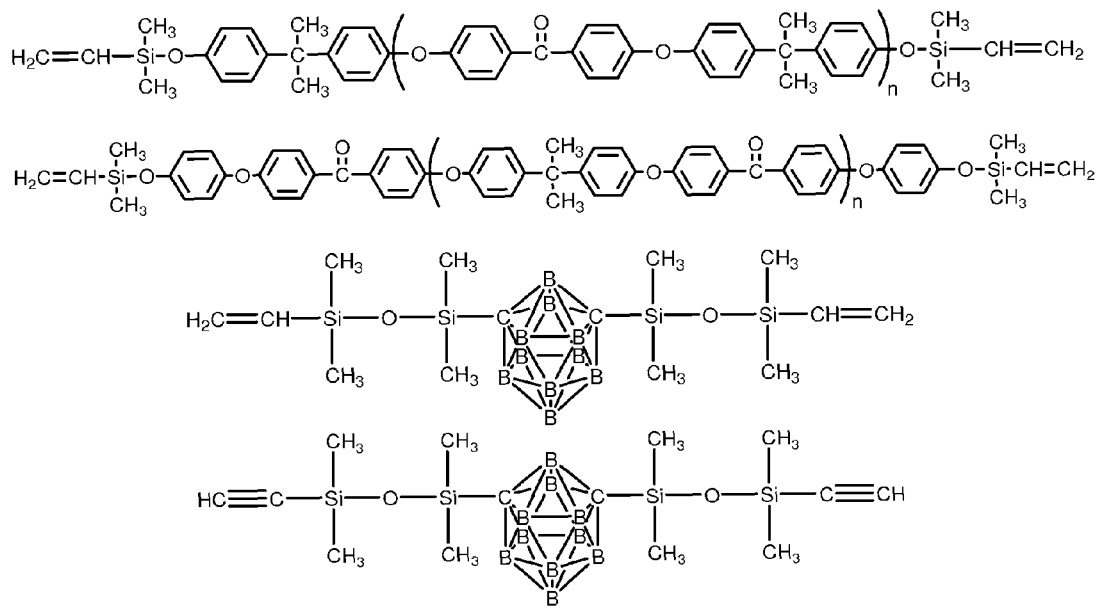
Figure 2:
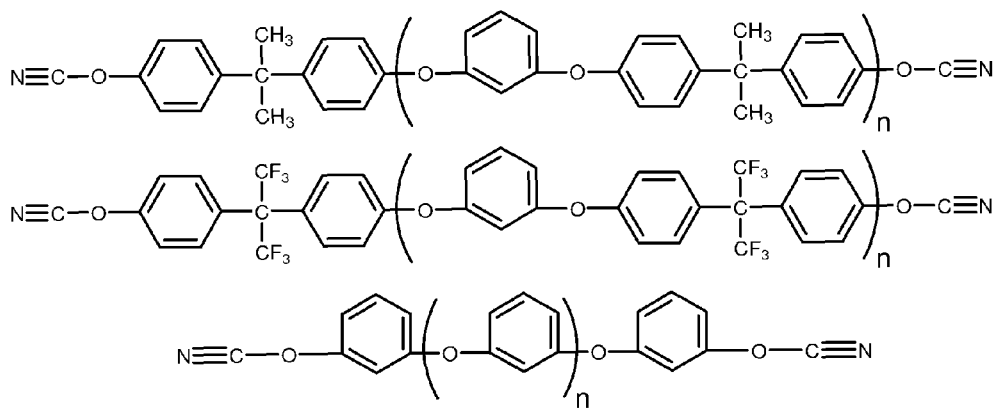

FIGS. 1 and 2 show examples of phthalonitriles, divinyl- or diethynyl-terminated resins, and cyanate esters. Such resins may include, for example, aromatic ether groups. The aromatic groups in any of these resins may include, but are not limited to, phenyl, biphenyl, benzophenone, bisphenol, bisphenol-F, phosphine-containing aromatic groups, and acetylene-containing aromatic groups. The resins may be linear molecules containing two crosslinking sites at the ends of the molecule. The resins may contain a single repeat unit or may have more than one repeat unit. In some cases, higher molecular weights may increase the viscosity to a point where mixing with the microspheres and/or crosslinking is less than optimal. Divinyl terminated resins may have silyl or siloxane groups adjacent to the vinyl groups and may be crosslinked with silane compounds such as, but not limited to, tetrakis (dimethylsiloxy)silane, methyltris(dimethylsiloxy)silane, phenyltris(dimethylsiloxy)silane, and a polyhedral oligomeric silsesquioxane, such as octasilane-POSS, as disclosed in the above cited patents. They may also contain siloxane and/or carborane groups.

The central oligomeric portion of many of these compounds may be made by reacting dihydroxy compounds with dihalo compounds, with one reactant in excess to produce oligomers with the same terminating group on both ends. The ratio of reactants determines the average value of n. The thermoset will likely contain a mixture of oligomers having a range of values for n. For example, the central portion of the second phthalonitrile compound in FIG. 1 may be made by reacting resorcinol with m-dibromobenzene. Phthalonitriles may be made by reacting the central hydroxy-terminated compound with 3- or 4-nitrophthalonitrile. Cyanate esters may be made by reacting the central hydroxy-terminated compound with cyanogen bromide (BrCN). The oligomers for the hydrosilation thermosets may be made by reacting a chloro-terminated oligomer with vinyl magnesium bromide or ethynyl magnesium bromide.

Figure 3:
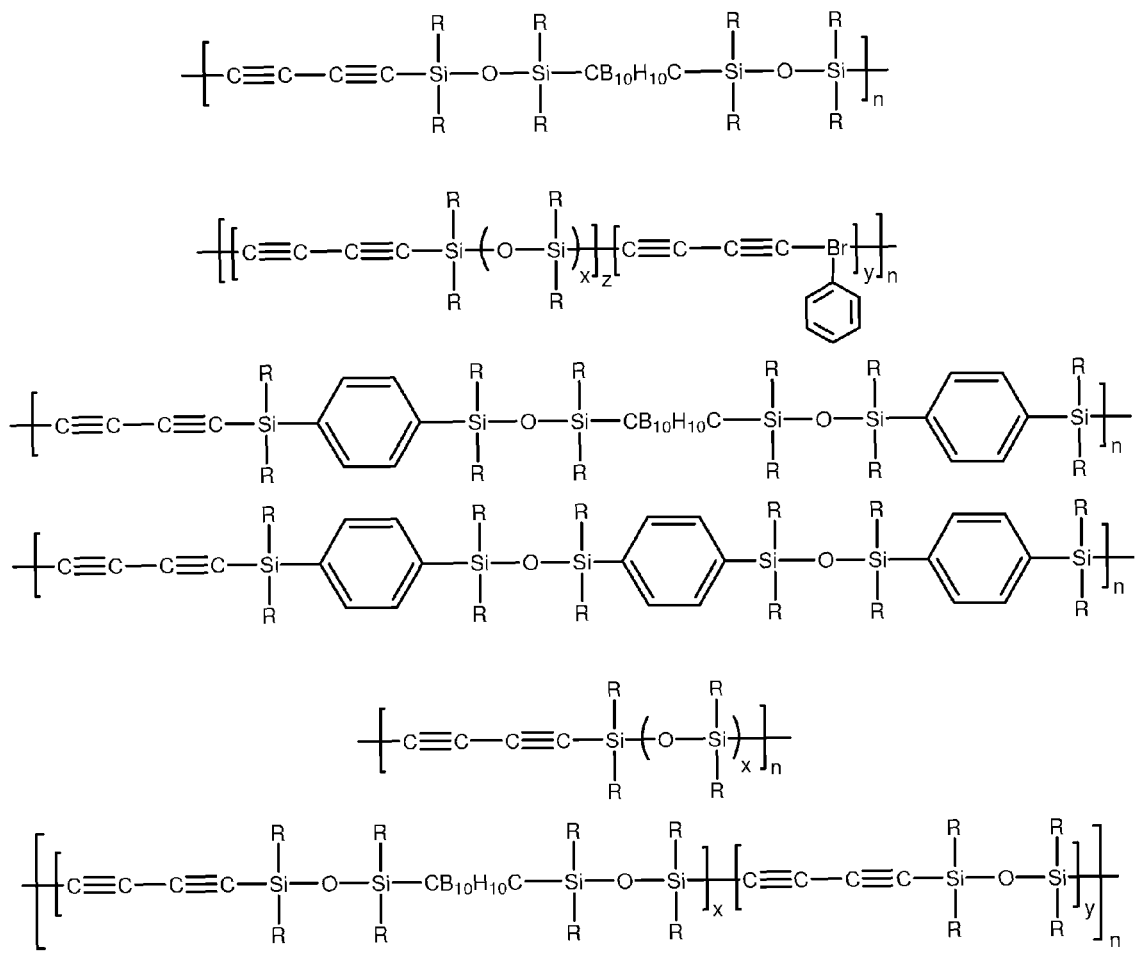
FIG. 3 shows example structures of inorganic-organic hybrid precursors

FIG. 3 shows examples of acetylene containing polymers. Such polymers may contain, for example, silyl groups, siloxane groups, carborane groups, and aromatic groups. Each acetylene group may act as a crosslinking site in such polymers.

Because of energy concerns and performance, lightweight, high temperature materials are in demand for many applications. Syntactic foams involving low to moderate temperature polymers have been previously used in such areas where low densities are required such as undersea/marine equipment for deep-ocean current metering, sandwich composites, and others. Also, their applications include products in aerospace and automotive industries. In most thermoplastics and low temperature thermosets (epoxies), the high viscosity of the polymers (melt phase) and the epoxy resins contribute to problems obtaining homogeneous compositions.

In the present disclosure, the syntactic foam is a ternary material system made in a mechanical way by mixing hollow particles (microballoons, the filler) with the high temperature resin system (the binder). The hollow particles may be made of silica, glass, polymer, ceramic, carbon, or metal. The particles may be smaller than 1 mm in diameter, or 100 μm or less. Suitable microballoons include, but are not limited to, silica microspheres ranging in diameter from 0.15-5.0 μm and POLYBEAD® Polystyrene Microspheres, both available from Polysciences, Inc. Dispersion of the hollow particles within the polymeric materials creates a porous material with closed cells. By changing the amount of hollow filler particles, different densities and thus microstructures of syntactic foam can be created. For example, a glass microballoon/ phthalonitrile composition containing only 5 wt % microballoons exhibits a density less than 1 g/ml as determined by the sample floating on the surface of water. Syntactic foams are known to possess low density, high stiffness, excellent compressive and hydrostatic strength, and good impact behavior. Such behavior is advantageous in the manufacturing process of aerospace structures. Using hollow microballoon particles, having a lower density compared to the binder material, allows for the controlled manufacturing of light-weight materials dependent on the filler content. This type of syntactic foam with a filler density that is lower compared to the binder can be considered as a special type of particulate-filled polymer composite (PFPC). The moduli and fracture properties often improve with increased solid filler content, given an intrinsically brittle matrix system and good interfacial bonding between the filler and the matrix.

The materials disclosed herein expand the usage of syntactic foams into high temperature (>500° C.) applications, which had not previously been addressed. The dispersion of the microballoons within the inorganic-organic hybrid polymers broadens the practice of microsphere-containing polymeric syntactic foams up to 500° C. Moreover, the hybrid polymers are precursors to ceramics which means that the microsphere can be fillers in polymeric-based lightweight ceramics for thermo-oxidative applications in excess of 500° C.

Upon heating to high temperatures, such as >500° C., portions of the thermoset may begin to char. The microspheres may also form a protective barrier for the thermoset in the interior of the article. This can result in a higher char yield than in the absence of the microspheres. This can occur with silica microspheres. At elevated temperatures, the silica may form a protective glass surrounding the interior of the sample, producing the increased char yield seen in FIGS. 4 and 5.

Figure 4:
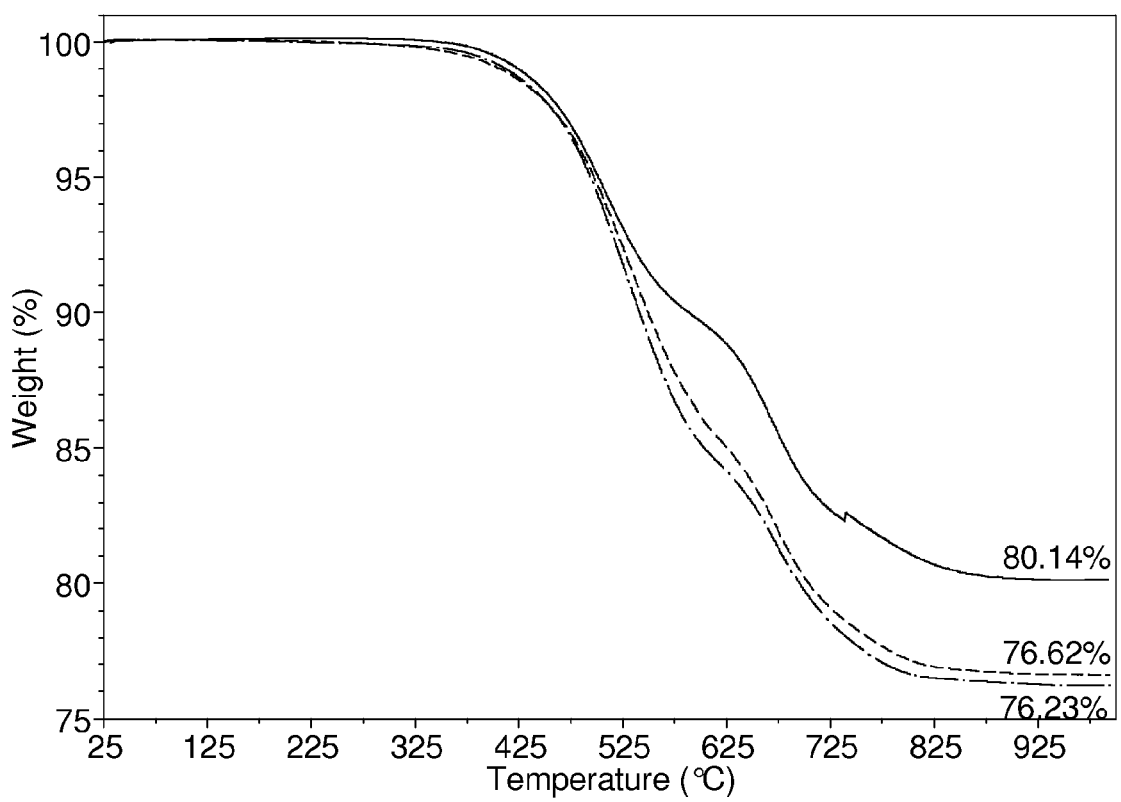
FIG. 4 shows TGA thermograms to 1000° C. in $N_2$ of crosslinked samples of (a) PCSA/Disil/2:1:1 (solid line), (b) PCSA/Disil/2:1:1+4 wt % silica microbeads (dash line) and PCSA/Disil/2:1:1+7 wt % silica microbeads (dash-dot line).
Figure 5:
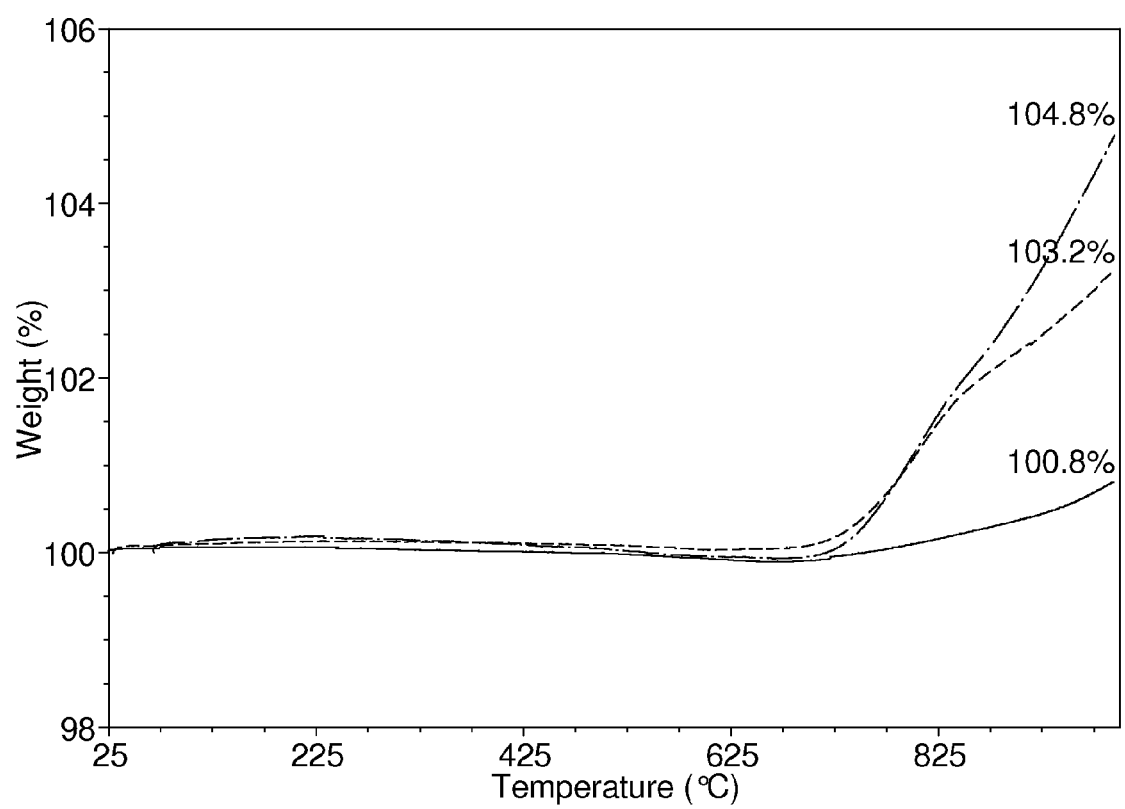
FIG. 5 shows TGA thermograms to 1000° C. in air (after being to 1000° C. in $N_2$) of crosslinked samples of (a) PCSA/Disil/2:1:1 (solid line), (b) PCSA/Disil/2:1:1+4 wt % silica microbeads (dash line) and PCSA/Disil/2:1:1+7 wt % silica microbeads (dash-dot line).

Typically, various amounts (1-70 wt %) of glass microspheres are added with stirring to various types of high temperature resins (FIGS. 1 and 2) including the divinyl terminated oligomeric aromatic ether resins, oligomeric aromatic ether containing cyanate ester (CE) resins, and poly (carborane-siloxane-diacetylene); these three resins are liquids at room temperature. In addition, the glass microspheres are added to several of the melts of the phthalonitriles. The compositions are subjected to reduced pressure to remove any residual volatiles and air pockets, followed by the addition of an appropriate amount of curing additives. Stirring is continued in some cases until the viscosity is increased to a point where the microspheres would remain suspended. This may be when the polymerization reaches the B-stage. At this point, the microspheres may be stirred into the mixture to create a homogenous mixture, and polymerization may continue to the final thermoset with no further mixing. In some cases depending on the resin system, conversion to the thermoset or networked system occurred in a short time (1-10 minutes). In the case of the phthalonitriles, some stirring or mixing was necessary until an increase in viscosity occurred to support the suspension and homogenous dispersion of the microballoons or microspheres. In two typical examples, phthalonitrile compositions containing 8 wt % and 20 wt % of glass microballoons had densities of 0.85 g/mL and 0.60 g/mL; they floated on the surface of water. The compositions showed long-term thermo-oxidative stability in excess of 300° C. Studies on the microballoon-inorganic-organic hybrid polymer compositions, i.e., poly(carborane-siloxane-acetylene), showed long-term thermo-oxidative stability up to 500° C. When the composition was further heated above 500° C., the polymeric matrix was converted to a ceramic, which again was less dense than water and showed long-term thermo-oxidative stability (FIGS. 4 and 5 show typical results).

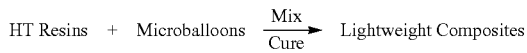

The low viscosity of the monomers pertaining to this invention enhances the ability to fabricate homogeneous microsphere compositions regardless of the concentration of microspheres relative to the monomers or binders. As observed from thermal analysis studies, the network coating and plastic systems show outstanding thermo-oxidative stability and other physical properties.

The following examples are given to illustrate specific applications. These specific examples are not intended to limit the scope of the disclosure in this application.

EXAMPLE 1

Synthesis of 2:1 hydroxy terminated oligomer based on bisphenol A and 1,3-dibromobenzene To a 100 mL, three-necked flask fitted with a thermometer, a Dean-Stark trap with condenser, and nitrogen inlet were added bisphenol A (10.0 g, 43.8 mmol), 1,3-dibromobenzene (2.64 mL, 5.16 g, 21.9 mmol), 1,10-phenanthroline (350 mg, 1.94 mmol) and N,N-dimethylformamide (50 mL). The resulting mixture was degassed with nitrogen for 10 minutes followed by the addition of copper (I) bromide (420 mg, 2.94 mmol) and $K_2CO_3$ (7.80 g, 23.9 mmol). After filling the Dean-Stark trap with toluene and adding 5 mL to the reaction flask, the mixture was refluxed at 145° C. for 1 hr. At this time, an additional portion of $K_2CO_3$ (15.1 g, 111 mmol) was added. The water that formed in the reaction was removed by azeotropic distillation. The mixture was refluxed for a total of 9-12 hr until no more water was observed being collected in the Dean-Stark trap. The remaining toluene was then removed by distillation and the reaction mixture cooled to ambient temperature. The mixture was then poured into water (500 mL). At this point, the mixture was slightly basic and 2 M HCl (300 mL) was added. The mixture was then extracted with ether (2×100 mL) and the combined ether layers were washed with 2 M HCl (1×100 mL) and water (1×100 mL). The hydroxy terminated oligomeric intermediate was extracted into the water layer by addition of 200 mL of 10% NaOH solution. The mixture was then extracted with ether (2×100 mL) to remove impurities and the water layer was made acidic by the addition of 100 mL of 2 M HCl solution. The aqueous solution was again extracted with ether (2×100 mL) and the ether layers were combined. Carbon black (2 g) was added and the ether filtered through a short plug of silica gel to remove any insoluble components. The solvent was removed and the oil was vacuum dried to yield the analytically pure 2:1 hydroxy terminated oligomer (10.3 g, 92%) as an amber colored solid.

EXAMPLE 2

Synthesis of 2:1 CE resin based on bisphenol A and 1,3-dibromobenzene

In a 250 mL, three-necked flask was placed the 2:1 hydroxy terminated oligomer from Example 1 (1.62 g, 3.05 mmol), cyanogen bromide (710 mg, 6.70 mmol), and dry acetone (10 mL). The reaction mixture was cooled to −10 to 0° C. and triethylamine (0.95 mL, 690 mg, 6.82 mmol) was added drop-wise so as to keep the temperature between −10 to 0° C. Following the addition, the reaction was stirred at 0° C. for an additional 2 hr. The mixture was poured into water (100 mL) and the water content was extracted with ether (2×50 mL). The ether layers were collected and immediately filtered through a short silica gel plug. The solvent was then removed and the resulting oil was dried under vacuum to yield the 2:1 bisphenol A based CE resin (1.62 g, 91%) as a yellow oil. IR [$cm^{-1}$]: ν 3060, 2969, 2270 (CN), 2236 (CN), 1591, 1502, 1478, 1222, 1171, 1013, 968, 833.

EXAMPLE 3

Formulation of 10 weight % microballoons in a 2:1 oligomeric CE resin based on bisphenol-A and 1,3-dibromobenzene A mixture formulated from the 2:1 oligomeric CE resin (1.00 g) in Example 2 and a catalytic amount of Cu (II) acetylacetonate (1% by weight) was heated at 100° C. until the mixture became viscous. The reaction content was cooled to 80° C. and silica microballoons (10 weight %) were immediately added with stirring for 2 h resulting in gelation. The microballoon-containing CE cured sample was postcured above 250° C. to completely cure the resin resulting in the formation of an opaque plastic, which had excellent thermal and oxidative stability. The density of the sample was around 0.82 g/mL.

EXAMPLE 4

Synthesis of 2:1 oligomeric phthalonitrile resin based on bisphenol A and 4,4-difluorobenzophenone To a 100 mL, three-necked flask fitted with a thermometer, a Dean-Stark trap with condenser, and a nitrogen inlet were added bisphenol A (10.0 g, 43.8 mmol), 4,4'-difluorobenzophenone (4.78 g, 21.9 mmol), powdered anhydrous $K_2CO_3$ (9.07 g, 65.7 mmol), toluene (10 mL), and N,N-dimethylformamide (50 mL). The resulting mixture was degassed with argon at ambient temperature and the Dean-Stark trap was filled with toluene. The mixture was refluxed at 135-145° C. under an argon atmosphere for 12 to 18 h or until no more water was observed being collected in the Dean-Stark trap. Toluene was then removed by distillation and the reaction mixture was cooled to 50° C. At this time, 4-nitrophthalonitrile (7.60 g, 43.9 mmol) was added in one portion and the reaction mixture was heated at 80° C. for 6-8 h. The mixture was allowed to cool to ambient temperature and poured into a 5% aqueous KOH solution resulting in the formation of a solid. The material was broken up and collected using a Büchner funnel. The white solid was dissolved in chloroform (200 mL), and washed with 200 mL of a 5% aqueous KOH solution, with 200 mL of distilled water until neutral, with 200 mL of a 5% aqueous HCl solution, and finally with 200 mL of water until neutral. The solvent was removed in vacuo and the solid was vacuum dried to yield the oligomeric phthalonitrile resin (18.2 g, 94%). $^1$H-NMR (300 MHz, $CDCl_3$): δ 7.77 (d, $^3J_{H,H}$=8.0, aromatic-H), 7.71 (dd, $^3J_{H,H}$=9.4, $^4J_{H,H}$=2.2, aromatic-H), 7.32 (dd, $^3J_{H,H}$=8.7, $^4J_{H,H}$=2.6, aromatic-H), 7.28-7.21 (m, aromatic-H), 7.05-6.94 (m, aromatic-H), 1.75-1.68 (m, $CH_3$). $^{13}$C-NMR (75 MHz, $CDCl_3$): δ 194.07 (C=O), 161.84, 161.43, 153.44, 151.50, 148.70, 148.33, 146.85, 146.44, 135.58, 132.29, 129.07, 128.47, 121.55, 120.24, 119.69, 117.50, 117.50, 115.62, 115.22, 108.66 (aromatic), 42.56, 31.04 (—$CH_3$). IR [$cm^{-1}$]: ν 3040 (C=CH), 2970 ($CH_3$), 2232 (CN), 1650 (C=O), 1592

(C=C), 1498 (aromatic), 1308 (aromatic), 1279 (C—O), 1246 (CH$_3$), 1160 (C—O), 928 (C—O), 837 (aromatic).

EXAMPLE 5

Formulation of 8 weight % microballoons in a 2:1 oligomeric phthalonitrile resin based on bisphenol-A and 4,4-difluorobenzophenone A mixture formulated from the 2:1 oligomeric phthalonitrile resin in Example 4 (1.00 g) and a catalytic amount of bis[4-4-aminophenoxy)phenyl]sulfone (p-BAPS) (50 mg) was heated at 300° C. until the mixture became viscous. Microballoons (8 weight %) were added with stirring and the temperature cooled to 250° C. The mixture was allowed to gel or solidify by heating at 250° C. for 12 h. The sample was postcured above 350° C. to completely cure the resin. The resulting microballoon-phthalonitrile composition was an opaque plastic, which had excellent thermal and oxidative stability. The density of the sample was around 0.85 g/mL.

EXAMPLE 6

Formulation of 20 weight % microballoons in a 2:1 oligomeric phthalonitrile resin based on bisphenol-A and 4,4-difluorobenzophenone A mixture formulated from the 2:1 oligomeric phthalonitrile resin in Example 4 (1.00 g) and a catalytic amount of p-BAPS (50 mg) was heated at 300° C. until the mixture became viscous. At this time, the reaction mixture was cooled to 250° C. and silica microballoons (20 weight %) were added with stirring at 250° C. for 12 h resulting in gelation. The sample was postcured above 350° C. to completely cure the resin. The resulting opaque microballoon-containing phthalonitrile plastic exhibited excellent thermal and oxidative stability. The density of the sample was around 0.60 g/mL.

EXAMPLE 7

Formulation of 30 weight % microballoons in a 2:1 oligomeric phthalonitrile resin based on bisphenol-A and 4,4-difluorobenzophenone A mixture formulated from the 2:1 oligomeric phthalonitrile resin in Example 4 (1.00 g) and a catalytic amount of p-BAPS (50 mg) was heated at 300° C. until the mixture became viscous. At this time, the reaction mixture was cooled to 250° C. and microballoons (30 weight %) were added with stirring at 250° C. for a short time to obtain a homogeneous mixture. The mixture was then heated at 250° C. for 12 h resulting in gelation. The sample was postcured above 350° C. to completely cure the resin. The resulting opaque microballoon-containing phthalonitrile plastic exhibited excellent thermal and oxidative stability. The density of the sample was around 0.50 g/mL.

EXAMPLE 8

Synthesis of 2:1 oligomeric vinyl silane terminated resin based on bisphenol-A and 1,3-dibromobenzene To a 100 mL, three-necked flask fitted with a thermometer, a Dean-Stark trap with condenser, and a nitrogen inlet were added the 2:1 hydroxyl terminated aromatic ether oligomer from Example 1 (2.00 g, 3.77 mmol), triethylamine (1.16 ml, 8.32 mmol) and anhydrous tetrahydrofuran (25 mL). The reaction mixture was cooled by means of an ice bath and vinyl(dimethylchloro)silane (1.09 mL, 7.70 mmol) was added dropwise. The resulting reaction mixture was stirred for 1 h and allowed to stabilize at room temperature while the reaction was progressing. The reaction product was then poured into water and extracted with diethyl ether. The solvent was removed in vacuo. The resulting oil was dissolved in 1:1 methylene chloride:hexane and filtered through a silica plug. The solvent was removed in vacuo and the clear oil was vacuum dried to yield the 2:1 oligomeric divinyl silane terminated resin (2.47 g, 98%). IR [cm$^{-1}$]: λ 3052 (C=CH), 2967 (CH$_3$), 1593 (C=C), 1500 (aromatic), 1242 (C—O), 1171 (C—O), 834 (aromatic).

EXAMPLE 9

Formulation of 5 weight % microballoons and 2:1 oligomeric divinyl silane terminated resin, based on bisphenol-A and 1,3-dibromobenzene, cured with tetrakis(dimethylsiloxy) silane (2:1 ratio) by a catalytic hydrosilylation reaction A mixture formulated from the 2:1 oligomeric divinyl silane terminated resin (0.50 g) of Example 8 and tetrakis (dimethylsiloxy) silane (0.12 mL) was dissolved in 1 mL of dry toluene at 70° C. To the clear homogeneous clear solution, silica microballoons (10 weight %) were added with stirring at 70° C. for about 5 minutes. At this time, the solution was cooled to about 0° C. and 50 μL of 2-2.5% platinum—vinyl-methylsiloxane complex in xylene solution was immediately added with stirring. The mixture was transferred to a silicone mold and allowed to cure or to consolidate at room temperature over a period of 10 h. The sample was postcured above 100° C. to completely cure the resin. The resulting plastic microballoon-containing composition was opaque, exhibited excellent thermal and oxidative stability, and retained >40% weight after heating under air to 1000° C. The density of the plastic microballoon-containing sample was around 0.92 g/mL.

EXAMPLE 10

Synthesis of 2:1 oligomeric phthalonitrile based on biphenol and 4,4'-dibromodiphenylacetylene To a 250 mL, three-necked flask fitted with a thermometer, a Dean-Stark trap with condenser, and a nitrogen inlet were added 4,4'-biphenol (10.0 g, 53.7 mmol), 4,4'-dibromodiphenylacetylene (8.93 g, 26.6 mmol), (PPh$_3$)$_3$CuBr (0.3 g), powdered anhydrous K$_2$CO$_3$ (11.1 g, 80.6 mmol), toluene (20 mL), and N,N-dimethylformamide (DMF) (100 mL). The resulting mixture was degassed with argon at ambient temperature. The Dean-Stark trap was filled with toluene and 5 mL was added to the reaction. The mixture was refluxed at 135-145° C. to remove the water by-product by azeotropic distillation under an argon atmosphere for 12 to 18 h or until no more water was observed being collected in the Dean-Stark trap. FTIR spectroscopy was used to confirm and monitor the formation of the desired oligomeric product. The toluene was then removed by distillation and the reaction mixture was cooled to 50° C. At this time, 4-nitrophthalonitrile (9.32 g, 53.9 mmol) was added in one portion and the resulting reaction mixture was heated at 80° C. for 6-8 h. The mixture was then allowed to cool to ambient temperature and poured into 500 mL of a 5% aqueous HCl solution resulting in the formation of a solid. The material was broken up and collected using a Büchner funnel. The white solid was dissolved in chloroform (200 mL), and washed with 200 mL of a 5% aqueous KOH solution, with 200 mL of distilled water until neutral, with 200 mL of a 5% aqueous HCl solution, and finally with 200 mL of water until neutral. The solvent was removed in vacuo and the solid was vacuum dried to yield the 2:1 oligomeric phthalonitrile (19.2 g, 90% yield). IR [cm$^{-1}$]:

λ 3075 (C═CH), 2232 (CN), 2202 (alkyne), 1585 (C═C), 1477 (aromatic), 1310 (aromatic), 1243 (C—O), 1172 (C—O), 977 (C—O), 837 (aromatic).

EXAMPLE 11

Formulation of 10 weight % microballoons in a 2:1 oligomeric phthalonitrile resin based on biphenol and 4,4'-dibromodiphenylacetylene in a solvent To a mixture of the 2:1 oligomeric phthalonitrile from Example 10 in an appropriate solvent (methylene chloride or tetrahydrofuran) was added silica microballoons (10 weight %). The mixtures were thoroughly mixed by stirring. The solvent was removed and the mixture heated and degassed at 200° C. Then 4 weight % of bis(4-[4-aminophenoxy]phenyl) sulfone (p-BAPS) or 1,3-bis(3-aminophenoxy)benzene (m-APB) was stirred in at 200° C. for 2 minutes and the mixture was cured under nitrogen by heating at 270° C. for 12 h (overnight), 300° C. for 4 h, 350° C. for 4 h, and 375° C. for 8 h to afford a microballoon-containing phthalonitrile polymer. The polymeric mixtures or compositions exhibited excellent thermal and oxidative stability up to 425-450° C. before any weight loss was detected. Catastrophic decomposition occurred after 500° C. in air. The density of the sample was around 0.85 g/mL.

EXAMPLE 12

Synthesis of 2:1 oligomeric phthalonitrile based on bisphenol-A and bis(4-fluorophenyl)phenylphosphine oxide To a 100 mL, three-necked flask fitted with a thermometer, a Dean-Stark trap with condenser, and a nitrogen inlet were added bisphenol A (5.00 g, 21.9 mmol), bis(4-fluorophenyl)phenylphosphine oxide (3.49 g, 11.1 mmol), powdered anhydrous $K_2CO_3$ (7.55 g, 54.7 mmol), toluene (10 mL), and N,N-dimethylformamide (DMF) (40 mL). The resulting mixture was degassed with argon at ambient temperature and the Dean-Stark trap was filled with toluene. The mixture was refluxed at 135-145° C. under an argon atmosphere for 12 to 18 h or until no more water was observed being collected by azeotropic distillation in the Dean-Stark trap. FTIR spectroscopy was used to confirm and to monitor the formation of the desired oligomeric product. The toluene was then removed by distillation and the reaction mixture was cooled to 50° C. At this time, 4-nitrophthalonitrile (3.87 g, 22.4 mmol) was added in one portion and the reaction mixture was heated at 80° C. for 6-8 h. The mixture was allowed to cool to ambient temperature and poured into 300 mL of a 5% aqueous HCl solution resulting in the formation of a solid. The material was broken up and collected using a Büchner funnel. The white solid was dissolved in chloroform (200 mL) and washed with 200 mL of a 5% aqueous KOH solution, with 200 mL of distilled water until neutral, with 200 mL of a 5% aqueous HCl solution, and finally with 200 mL of water until neutral. The solvent was removed in vacuo and the solid was vacuum dried to yield the 2:1 oligomeric phthalonitrile (9.89 g, 91%). $^1$H-NMR (300 MHz, $CDCl_3$): δ 7.61-7.52 (m, aromatic-H), 7.43-7.31 (m, aromatic-H), 7.34-7.19 (m, aromatic-H), 7.02-6.92 (m, aromatic-H), 1.75-1.66 (m, $CH_3$). IR [$cm^{-1}$]: λ3058 (C═CH), 2969 ($CH_3$), 2231 (CN), 1589 (C═C), 1491 (aromatic), 1281 ($CH_3$), 1248 (C—O), 1173 (C—O), 1117, (P═O), 970 (C—O), 834 (aromatic).

EXAMPLE 13

Formulation of 20 weight % microballoons in a 2:1 oligomeric phthalonitrile resin based on bisphenol-A and bis(4-fluorophenyl)phenylphosphine oxide in a solvent To a mixture of the 2:1 oligomeric phthalonitrile from Example 12 in an appropriate solvent (methylene chloride or tetrahydrofuran) was added silica microballoons (20 weight %). The solvent was removed and the mixture was heated and degassed at 200° C. Then an appropriate weight % of bis(4-[4-aminophenoxy]phenyl)-sulfone (p-BAPS) or 1,3-bis(3-aminophenoxy)benzene (m-APB) was added with stirring at 200° C. for 2 minutes. The resulting microballoon-phthalonitrile mixture was cured under nitrogen by heating at 270° C. for 12 h (overnight), 300° C. for 4 h, 350° C. for 375° C. for 8 h to afford a microballoon-containing polymeric composition. The polymer exhibited excellent thermal and oxidative stability up to 450° C. Catastrophic decomposition occurred after 500° C. The density of the sample was around 0.65 g/mL.

EXAMPLE 14

Synthesis of 2:1 oligomeric divinyl silane terminated resin based on bisphenol-A and 4,4'-difluorobenzophenone To a 100 mL, three-necked flask fitted with a thermometer, a Dean-Stark trap with condenser, and a nitrogen inlet were added the 2:1 bisphenol A\benzophenone based hydroxyl terminated aromatic ether oligomer from Example 4 (10.0 g, 15.7 mmol), triethylamine (4.72 ml, 33.9 mmol) and anhydrous tetrahydrofuran (100 mL). The reaction mixture was cooled by means of an ice bath and vinyl(dimethylchloro)silane (4.68 ml, 33.1 mmol) was added dropwise. The resulting reaction mixture was stirred for 1 h. The mixture was then poured into water and extracted with diethyl ether. The solvent was removed in vacuo and the resulting oil dissolved in 1:1 methylene chloride:hexane and filtered through a silica plug. The solvent was removed in vacuo and the clear oil was vacuum dried to yield the 2:1 oligomeric vinyl silane terminated resin (11.5 g, 91%). IR [$cm^{-1}$]: λ 3052 (C═CH), 2967 ($CH_3$), 1654 (C═O), 1593 (C═C), 1500 (aromatic), 1242 (C—O), 1171 (C—O), 834 (aromatic).

EXAMPLE 15

Formulation of 15 weight % microballoons with a catalytic hydrosilylation reaction of 2:1 oligomeric vinyl silane terminated resin based on bisphenol-A and 4,4'-difluorobenzophenone and tetrakis(dimethylsiloxy)silane (2:1 ratio, rapid cure)

A mixture formulated from the 2:1 oligomeric vinyl silane terminated resin (0.38 g) of Example 14 and tetrakis(dimethylsiloxy)silane (0.07 mL) was dissolved in 1 mL of dry toluene and various amount of silica microballoons (15 weight %) were added with stirring. With continued stirring, a rapid cure catalyst (50 μL of a 2-2.5% platinum-vinylmethylsiloxane complex in xylene solution) was added. The mixture was transferred to a silicone mold and was allowed to gel at room temperature (5 seconds). The sample was post cured above 100° C. to completely cure the resin. The result was an opaque elastomeric sample which had good thermal and oxidative stability and retained >40% weight after heating under air to 1000° C. The density of the sample was around 0.75 g/mL.

EXAMPLE 16

Synthesis of poly(carborane-siloxane-acetylene) (PCSA/Disil/2:1:1)

In a typical synthesis, a 2.5M hexane solution of n-BuLi (34.2 ml, 85.5 mmol) in 12.0 ml of THF was cooled to −78° C. under an argon atmosphere. Hexachlorobutadiene (5.58 g, 21.4 mmol) in 2.0 ml THF was added dropwise by cannula. The reaction was allowed to warm to room temperature and stirred for 2 hours. The 1,4-dilithiobutadiyne in THF was then cooled to −78° C. At this time, an equimolar amount of 1,7-bis(chlorotetramethyldisiloxyl)-m-carborane (10.22 g, 21.4 mmol) in 4.0 ml THF was added dropwise by cannula while stirring. The temperature of the reaction mixture was allowed to slowly rise to room temperature. While stirring the mixture for 1 hour, a copious amount of white solid (LiCl) was formed. The reaction mixture was poured into 100 mL of dilute hydrochloric acid resulting in dissolution of the salt and the separation of a viscous oil. The polymer was extracted into ether. The ethereal layer was washed several times with water until the washing was neutral, separated, and dried over anhydrous sodium sulfate. The ether was evaporated at reduced pressure leaving a dark-brown viscous PCSA polymer. A 97% yield (9.50 g) was obtained after drying in vacuo. Heating the PCSA under vacuum at 150° C. removed lower molecular weight volatiles giving a 92% overall yield. Major FTIR peaks (cm$^{-1}$): 2963 (C—H); 2600 (B—H); 2175 (C—C); 1260 (Si—C); and 1080 (Si—O).

EXAMPLE 17

Formulation of 4 Weight % Microballoons in PCSA 1.0 gram of poly(carborane-disiloxane-diacetylene) (PCSA/Disil/2:1:1) of Example 16 and 40 mg of silica microballoons (4 weight %) were added to an aluminum planchet. The mixture was initially heated at 250° C. and subsequently at around 325° C. for 20 minutes each. During the heating, the mixture was constantly stirred to prevent the agglomeration of the microballoons (microbeads). An inert gas (argon) was also intermittently blanketed over the sample. On heating, the sample became very viscous and resistant to stirring and appeared to contain some voids. Heating was discontinued at this point and the sample was placed on a hot plate in a vacuum desiccator and subjected to a full vacuum at room temperature for 2 h to remove any visually discernible voids. The temperature of the hot plate was slowly raised to 200° C. while under a full vacuum for 14 h. The sample was then heated under reduced pressure at 350° C. for 2 h and at 400° C. for 1 h. A void-free sample was obtained that contained the silica microballoons. The density of the sample was 0.93 g/mL. The char yield of the microballoon-PCSA composition at 1000° C. in N$_2$ was 76.62% (FIG. 4). The char yield of the composition initially treated to 1000° C. in N$_2$ and subsequently heated to 1000° C. in air was 103.2% (FIG. 5). For comparison, similarly fabricated samples of neat poly(carborane-disiloxane-diacetylene) had char yield when heated to 1000° C. in N$_2$ of 80.1% (FIG. 4). The char yield of PCSA heated to 1000° C. in N$_2$ and subsequently heated to 1000° C. in air was 100.8% (FIG. 5).

EXAMPLE 18

Formulation of 7 Weight % Microballoons in PCSA 1.0 gram of poly(carborane-disiloxane-diacetylene) (PCSA/Disil/2:1:1) of Example 16 and 70 mg of silica microballoons (7 weight %) were added to an aluminum planchet. The mixture was initially heated at 250° C. and subsequently at around 325° C. for 20 minutes each. During the heating, the mixture was constantly stirred to prevent the agglomeration of the microballoons (microbeads). An inert gas (argon) was also intermittently blanketed over the sample. On heating, the sample became very viscous and resistant to stirring and appeared to contain some voids. Heating was discontinued at this point and the sample was placed on a hot plate in a vacuum desiccator and subjected to a full vacuum at room temperature for 2 h to remove any visually discernible voids. The temperature of the hot plate was slowly raised to 200° C. and the sample was heated under a full vacuum for 14 h. The composition was then heated at 350° C. for 2 h and at 400° C. for 1 h while under a full vacuum. A void-free sample was obtained that contained the silica microballoons. The density of the sample was 0.90 g/mL. The char yield of the composition initially heated at 1000° C. in N$_2$ was 76.23% (FIG. 4). The char yield of another sample treated to 1000° C. in N$_2$, cooled to room temperature, and subsequently heated to 1000° C. in air was 104.8% (FIG. 5). For comparison, similarly fabricated samples of neat poly(carborane-disiloxane-diacetylene) had a char yield when heated to 1000° C. in N$_2$ of 80.1% (FIG. 4). The char yield of PCSA heated to 1000° C. in N$_2$ and subsequently heated to 1000° C. in air was 100.8% (FIG. 5).

EXAMPLE 19

Synthesis of 1,7-bis(vinyltetramethyldisiloxyl)-m-carborane

A 250 mL Schlenk flask containing 1,7-bis(chlorotetramethyldisiloxyl)-m-carborane (21.08 g, 44.15 mmol) in THF (50 mL) was cooled in an ice bath. The solution was then treated with 89 mL of 1.0 M vinylmagnesium bromide (89 mmol), which was added slowly via syringe. After the addition was complete, the cold bath was removed and the resulting solution was allowed to stir at room temperature for 2 h. The solution was quenched by the addition of Me$_3$SiCl (2-3 mL) and cold, saturated aqueous NH$_4$Cl (30 mL). The organic layer was separated and the aqueous portion extracted with ether (2×20 mL). The organic extracts were combined, dried over anhydrous MgSO$_4$, and the solution filtered through celite. After removal of volatiles at reduced pressure, the crude product was purified by column chromatography using hexane as the eluting solvent. Evaporation of solvent left pure 1,7-bis(vinyltetramethyldisiloxyl)-m-carborane (18.51 g, 91% yield).

EXAMPLE 20

Formulation of 3 weight % microballoons in 1,7-bis(vinyltetramethyldisiloxyl)-m-carborane cured with tetrakis(dimethylsiloxy)silane 1.0 gram (2.17 mmol) of 1,7-bis(vinyltetramethyldisiloxyl)-m-carborane of Example 19 was added to a vial, dissolved in 2 mL of hexanes, and mixed with 50 µL of the Karstedt catalyst solution (2.4 wt % Pt) using a mechanical stirrer. To this mixture, 0.40 mL of tetrakis(dimethylsiloxy)silane (1.085 mmol; Si—H:vinyl ratio of 1:1) was added and was stirred vigorously for 2 min. At this point, 40 mg of silica microballoons (~3 weight %) was added and mixed thoroughly. The mixture was transferred into an aluminum planchet and heated at around 50° C. with constant stirring to prevent the agglomeration of the silica microballoons. When the mixture became viscous and exhibited resistance to stirring, the temperature was raised to 80° C. and the mixture was heated at this temperature for 2 h. A void-free sample was obtained that contained the silica microballoons. The density of the resulting composition was 0.88 g/mL. The char yield of the sample heated to 1000° C. in N$_2$ was 69%. The char yield of another composition heated to 1000° C. in N$_2$, cooled, and subsequently heated to 1000° C. in air was 101%.

EXAMPLE 21

Formulation of 5 weight % microballoons in 1,7-bis(vinyltetramethyldisiloxyl)-m-carborane cured with tetrakis(dimethylsiloxy)silane 1.0 gram (2.17 mmol) of 1,7-bis(vinyltetramethyldisiloxyl)-m-carborane of Example 19 was added to a vial, dissolved in 2 mL of hexanes, and mixed with 50 μL of the Karstedt catalyst solution (2.0-2.4 wt % Pt) using a mechanical stirrer. To this mixture, 0.40 mL of tetrakis(dimethylsiloxy)silane (1.085 mmol; Si—H:vinyl ratio of 1:1) was added and stirred vigorously for 2 min. At this point, 70 mg of silica microballoons (~5 weight %) was added and mixed thoroughly. The mixture was then transferred into an aluminum planchet and was heated at around 50° C. with constant stirring to prevent the agglomeration of the silica microbeads. When the mixture became viscous and exhibited resistance to stirring, the temperature was raised to 80° C. and the mixture was heated at this temperature for 2 h. A void-free sample was obtained that contained the silica microballoons. The density of the sample was 0.90 g/mL. The char yield of the composition heated to 1000° C. in $N_2$ was 68%. The char yield of another composition heated to 1000° C. in $N_2$, cooled, and subsequently heated to 1000° C. in air was 102%.

EXAMPLE 22

Formulation of 3 weight % microballoons in 1,7-bis(vinyltetramethyldisiloxyl)-m-carborane cured with methyltris(dimethylsiloxy)silane 1.0 gram (2.17 mmol) of 1,7-bis(vinyltetramethyldisiloxyl)-m-carborane of Example 19 was added to a vial, dissolved in 2 mL of hexanes, and mixed with 50 μL of the Karstedt catalyst solution (2.0-2.4 wt % Pt) using a mechanical stirrer. To this mixture, 0.45 mL of methyltris(dimethylsiloxy)silane (1.45 mmol; Si—H:vinyl ratio of 1:1) was added and stirred vigorously for 2 min. At this point, 40 mg of silica microballoons (~3 weight %) was added and mixed thoroughly with the stirrer. The mixture was then transferred into an aluminum planchet and heated at around 50° C. with constant stirring to prevent the agglomeration of the silica microballoons. When the mixture became viscous and exhibited resistance to stirring, the temperature was raised to 80° C. and the mixture was heated at this temperature for 2 h. A void-free sample was obtained that contained the silica microballoons. The density of the sample was 0.87 g/mL. The char yield of the composition heated to 1000° C. in $N_2$ was 64%. The char yield of another composition heated to 1000° C. in $N_2$, cooled, and subsequently heated to 1000° C. in air was 101%.

EXAMPLE 23

Formulation of 3 weight % microballoons in 1,7-bis(vinyltetramethyldisiloxyl)-m-carborane cured with phenyltris(dimethylsiloxy)silane 1.0 gram (2.17 mmol) of 1,7-bis(vinyltetramethyldisiloxyl)-m-carborane of Example 19 was added to a vial, dissolved in 2 mL of hexanes, and mixed with 50 μL of the Karstedt catalyst solution (2.0-2.4 wt % Pt) using a mechanical stirrer. To this mixture, 0.52 mL of phenyltris(dimethylsiloxy)silane (1.45 mmol; Si—H:vinyl ratio of 1:1) was added and stirred vigorously for 2 min. At this point, 40 mg of silica microballoons (~3 weight %) was added and was mixed thoroughly with the stirrer. The mixture was then transferred into an aluminum planchet and heated at around 50° C. with constant stirring to prevent the agglomeration of the silica microballoons. When the mixture became viscous and exhibited resistance to stirring, the temperature was raised to 80° C. and the mixture was heated at this temperature for 2 h. A void-free sample was obtained that contained the silica microballoons. The density of the sample was 0.88 g/mL. The char yield of the composition heated to 1000° C. in $N_2$ was 65%. The char yield of another composition heated to 1000° C. in $N_2$, cooled, and subsequently heated to 1000° C. in air was 101%.

EXAMPLE 24

Formulation of 3.5 weight % microballoons in 1,7-bis(vinyltetramethyldisiloxyl)-m-carborane cured in presence of octasilane-POSS (Crosslinked network containing only hydrosilated —Si—C(H)—C(H)—Si— linkages): In a typical reaction, 0.75 g of the 1,7-bis(vinyltetramethyldisiloxyl)-m-carborane (1.62 mmol; M.W.=460.36 g/mol) of Example 19 and 0.414 g of octasilane-POSS (0.405 mmol; M.W.=1018 g/mol, see below) were added to a reaction vial and mixed thoroughly using a mechanical stirrer. This yielded a Si—H:vinyl ratio of 1:1 in the reaction mixture. To the mixture, 3 mL of either $CH_2Cl_2$ or toluene was added and the content was thoroughly mixed using the stirrer to yield a clear solution. At this point, 50 μL of a 2.0-2.4 wt % Pt Karstedt catalyst solution in xylenes was added drop-wise, which was followed by 2 min of thorough mixing. The solution became warmer and appeared yellow in color. At this point, 40 mg of silica microballoons (~3.5 weight %) was added and mixed thoroughly by stirring. The mixture was then transferred into an aluminum planchet and heated at around 50° C. with constant stirring to prevent the agglomeration of the silica microballoons. When the mixture became viscous and exhibited resistance to stirring, the temperature was raised to 80° C. (in the case of $CH_2Cl_2$) or 110° C. (in the case of toluene) and the mixture was heated at this temperature for 2 h. A void-free sample was obtained that contained the silica microballoons. The density of the sample was 0.85 g/mL. The char yield of the composition heated to 1000° C. in $N_2$ was 80%. The char yield of another composition heated to 1000° C. in $N_2$, cooled, and subsequently heated to 1000° C. in air was 103%.

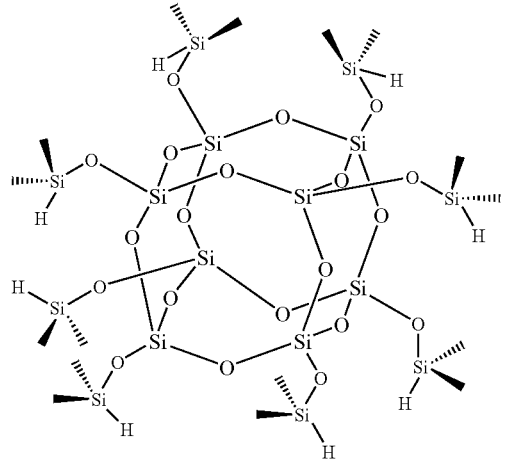

EXAMPLE 25

Formulation of 6 weight % microballoons in 1,7-bis(vinyltetramethyldisiloxyl)-m-carborane cured in presence of octasilane-POSS (Crosslinked network containing only hydrosilated —Si—C(H)—C(H)—Si— linkages): In a typical reaction, 0.75 g of the 1,7-bis(vinyltetramethyldisiloxyl)-m-carborane (1.62 mmol; M.W.=460.36 g/mol) of Example 19 and 0.414 g of octasilane-POSS (0.405 mmol; M.W.=1018 g/mol) were added to a reaction vial and mixed thoroughly using a mechanical stirrer. This yielded a Si—H:vinyl ratio of 1:1 in the reaction mixture. To the mixture, 3 mL of either $CH_2Cl_2$ or toluene was added and the content was thoroughly mixed using the stirrer to yield a clear solution. At this point, 50 μL of a 2.0-2.4 wt % Pt Karstedt catalyst solution in xylenes was added drop-wise, which was followed by 2 min of thorough mixing. The solution became warmer and appeared yellow in color. At this point, 70 mg of silica microballoons (~6 weight %) was added and mixed thoroughly. The mixture was transferred into an aluminum planchet and was heated at around 50° C. with constant stirring to prevent the agglomeration of the silica microballoons. When the mixture became viscous and exhibited resistance to stirring, the temperature was raised to 80° C. (in the case of $CH_2Cl_2$) or 110° C. (in the case of toluene) and the mixture was heated at this temperature for 2 h. A void-free sample was obtained that contained the silica microballoons. The density of the sample was 0.84 g/mL. The char yield of the composition heated to 1000° C. in $N_2$ was 79%. The char yield of another composition heated to 1000° C. in $N_2$, cooled, and subsequently heated to 1000° C. in air was 104%.

EXAMPLE 26

Formulation of 3.5 weight % microballoons in 1,7-bis(vinyltetramethyldisiloxyl)-m-carborane cured in presence of octasilane-POSS (Crosslinked network containing both hydrosilated —Si—C(H)—C(H)—Si— and —Si—O—Si— linkages): In a typical reaction, 0.50 g of the 1,7-bis(vinyltetramethyldisiloxane)-m-carborane (1.08 mmol) of Example 19 and 0.542 g of octasilane-POSS (0.54 mmol) were added to a reaction vial and mixed thoroughly using a mechanical stirrer. This yielded a Si—H:vinyl ratio of 2:1 in the reaction mixture. To the mixture, 5 mL of either $CH_2Cl_2$ or toluene was added and the content was thoroughly mixed using the stirrer to yield a clear solution. At this point, 2 drops of a 2.0-2.4 wt % Pt Karstedt catalyst solution in xylenes were added drop wise, which was followed by 2 min of thorough mixing. The solution became warmer and appeared yellow in color. The solution in the vial was then placed on a hot plate for 2 hours at 40° C. for $CH_2Cl_2$ solution and at 70° C. for the toluene solution. To the solutions, 50 μL of $Et_3N$ and distilled water were added in succession causing the mixture to turn turbid (milky white in appearance). At this point, 38 mg of silica microballoons (~3.5 weight %) was added and mixed thoroughly. The mixtures were then transferred into an aluminum planchet and were heated on a hotplate between 100-125° C. for 30 min. during which complete gelation was observed to occur and the solvent volatilized. A void-free sample containing both hydrosilated —Si—C(H)—C(H)—Si— and —Si—O—Si— linkages and the silica microballoons was obtained. The density of the sample was 0.84 g/mL. The char yield of the composition heated to 1000° C. in $N_2$ was 82%. The char yield of another composition heated to 1000° C. in $N_2$, cooled, and subsequently heated to 1000° C. in air was 104%.

EXAMPLE 27

Synthesis of 1,7-bis(ethynyltetramethyldisiloxyl)-m-carborane

A flame-dried 250 mL Schlenk flask containing 1,7-bis(chlorotetramethyldisiloxyl)-m-carborane (15.81 g, 33.11 mmol) in THF (30 mL) was cooled in an ice bath. The solution was then treated with 133 mL of 0.5 M ethynyl magnesium bromide (66.5 mmol), which was added slowly via syringe. After the addition was completed, the cold bath was removed and the resulting solution was allowed to stir at room temperature for 2 h. The solution was quenched by addition of $Me_3SiCl$ (2-3 mL) and stirred for 30 min at room temperature. The reaction was then treated with diethyl ether (30 mL) and cold, saturated aqueous $NH_4Cl$ (40 mL). The organic layer was separated and the aqueous portion extracted with ether (2×30 mL). The organic extracts were combined, dried over $Na_2SO_4$, and the solution filtered through celite. After removal of volatiles with vacuum, the crude product was purified by column chromatography (two times, $SiO_2$) eluting with hexanes. Evaporation of solvent left a pure product (12.41 g, 82%). IR (KBr, $cm^{-1}$): 3290 ($v_{C-H}$—$C_2H_3$), 2964 ($v_{C-H}$ Si—$CH_3$), 2596 ($v_{B-H}$), 2039 ($v_{C-C}$), 1596 ($v_{CH-CH2}$), 1260 ($v_{Si-C}$), 1080 ($v_{Si-O}$), 798 ($v_{Si-C\,bend}$). $^1$H NMR ($CDCl_3$, ppm): 0.23 (Si—$CH_3$), 0.27 (Si—$CH_3$), and 2.41 (—$C_2H$). $^{13}C\{^1H\}$ NMR ($CDCl_3$, ppm): 0.25 (Si—$CH_3$), 1.89 (Si—$CH_3$), 68.15 (m-$C_2B_{10}H_{10}$), 88.58 (—CCH), 92.64 (—CCH).

EXAMPLE 28

Formulation of 5 weight % microballoons in 1,7-bis(ethynyltetramethyldisiloxyl)-m-carborane cured with tetrakis(dimethylsiloxy)silane A sample (1.0 g; 2.18 mmol) of 1,7-bis(ethynyltetramethyldisiloxyl)-m-carborane of Example 27 was added to a vial, dissolved in 2 mL of hexanes, and mixed with 50 μL of the Karstedt catalyst solution (2-2.4 wt % Pt) using a mechanical stirrer. To this mixture, 0.40 mL of tetrakis(dimethylsiloxy)silane (1.085 mmol; Si—H:vinyl ratio of 1:2) was added and stirred vigorously for 2 min. At this point, 70 mg of silica microballoons (~5 weight %) was added and mixed thoroughly. The mixture was then transferred into an aluminum planchet and heated at around 50° C. with constant stirring to prevent the agglomeration of the silica microballoons. When the mixture became viscous and exhibited resistance to stirring, the temperature was raised to 80° C. and the mixture was heated at this temperature for 2 h. A void-free sample was obtained that contained the silica microballoons. The density of the sample was 0.89 g/mL. The char yield of the composition heated to 1000° C. in $N_2$ was 69%. The char yield of another composition heated to 1000° C. in $N_2$, cooled, and subsequently heated to 1000° C. in air was 103%.

Obviously, many modifications and variations are possible in light of the above teachings. It is therefore to be understood that the claimed subject matter may be practiced otherwise than as specifically described. Any reference to claim elements in the singular, e.g., using the articles "a," "an," "the," or "said" is not construed as limiting the element to the singular.

What is claimed is:
1. A composition comprising:
   a hydrosilation thermoset and a plurality of hollow microspheres homogenously dispersed in the composition;
   wherein the hydrosilation thermoset is made by reacting tetrakis(dimethylsiloxy)silane, methyltris(dimethylsiloxy)silane, phenyltris(dimethylsiloxy)silane, or the polyhedral oligomeric silsesquioxane ((SiH(CH3)2O)SiO1.5)8 with

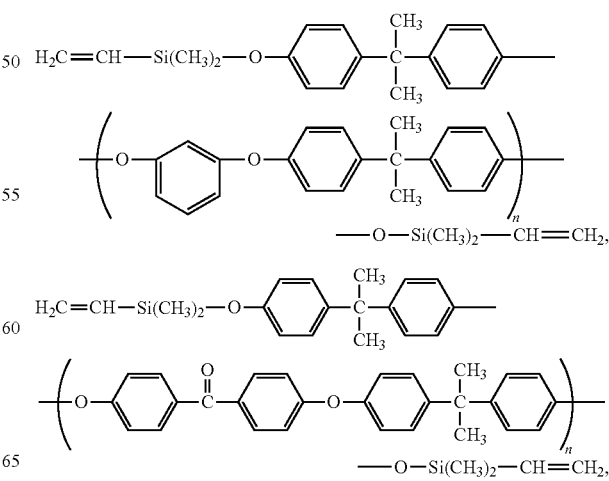

-continued

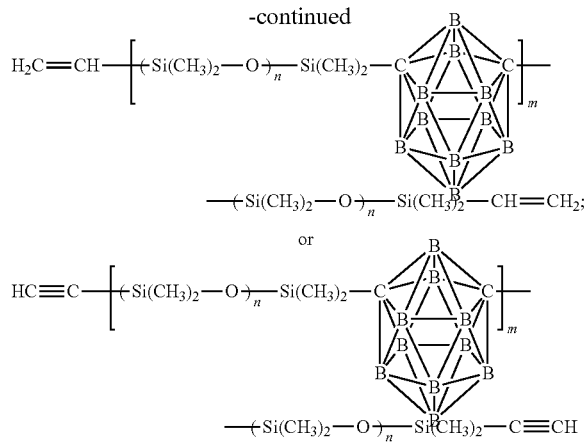

wherein m is a positive integer; and
wherein n is a positive integer.

2. The composition of claim 1, wherein excess tetrakis(dimethylsiloxy)silane, methyltris(dimethylsiloxy)silane, phenyltris(dimethylsiloxy)silane, or ((SiH(CH3)2O)SiO1.5)8 is present resulting in the formation of siloxane bonds therebetween.

3. The composition of claim 1, wherein the composition comprises from about 1 wt % to about 35 wt % of the microspheres.

4. The composition of claim 1, wherein the microspheres comprise silica.

5. The composition of claim 1, wherein the composition has a char yield at 1000° C. under nitrogen of at least about 60%.

6. A ceramic composition having a density less than 1 g/mL, made by heating the composition of claim 1 to a temperature of at least about 500° C. in an oxidizing atmosphere.

7. A method comprising:

providing a thermosetting compound selected from cyanate ester, phthalonitrile, acetylene containing compound, and hydrosilating compound a mixture of a crosslinker selected from tetrakis(dimethylsiloxy)silane, methyltris(dimethylsiloxy)silane, phenyltris(dimethylsiloxy)silane, or the polyhedral oligomeric silsesquioxane ((SiH(CH3)2O)SiO1.5)8 with a thermosetting compound selected from

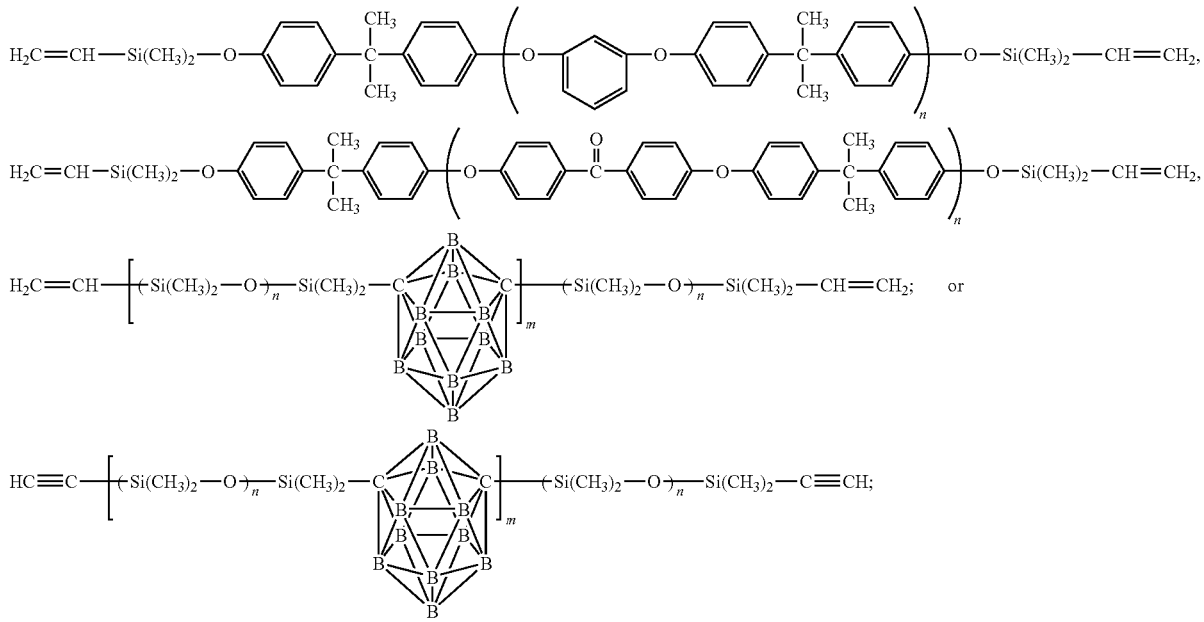

wherein m is a positive integer; and
wherein n is a positive integer;
adding microspheres to the mixture; and
mixing the mixture while initiating crosslinking of the thermosetting compound.

8. The method of claim 7, wherein excess tetrakis(dimethylsiloxy)silane, methyltris(dimethylsiloxy)silane, phenyltris(dimethylsiloxy)silane, or ((SiH(CH3)2O)SiO1.5)8 is present resulting in the formation of siloxane bonds therebetween.

9. The method of claim 7, wherein from about 1 wt % to about 35 wt % of the microspheres are used.

10. The method of claim 7, wherein the microspheres comprise silica.

11. A method comprising:
heating the product of the method of claim 7 to a temperature of at least about 500° C. in an oxidizing atmosphere.

12. A composition comprising:
a compound selected from

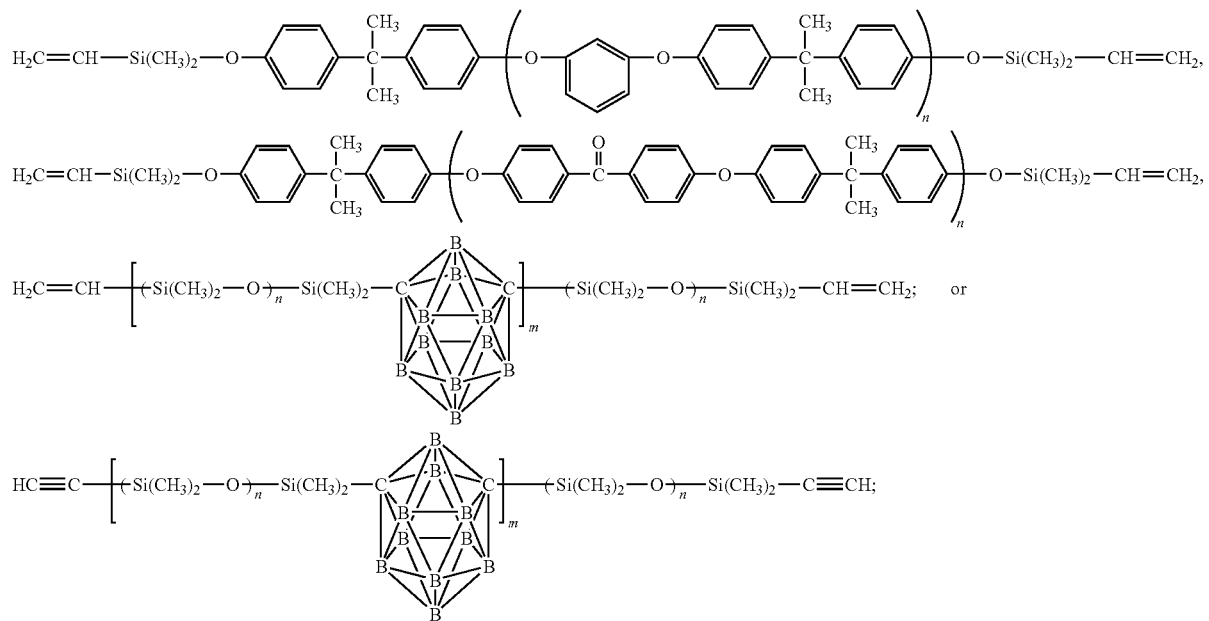

wherein m is a positive integer; and
wherein n is a positive integer;
a compound selected from tetrakis(dimethylsiloxy)silane, methyltris(dimethylsiloxy)silane, phenyltris(dimethylsiloxy)silane, or the polyhedral oligomeric silsesquioxane ((SiH(CH3)2O)SiO1.5)8; and
a plurality of hollow microspheres.

13. The composition of claim 12, wherein the composition comprises from about 1 wt % to about 35 wt % of the microspheres.

14. The composition of claim 12, wherein the microspheres comprise silica.

* * * * *

UNITED STATES PATENT AND TRADEMARK OFFICE
CERTIFICATE OF CORRECTION

PATENT NO.        : 8,288,454 B2
APPLICATION NO.   : 12/539039
DATED             : October 16, 2012
INVENTOR(S)       : Teddy M Keller et al.

It is certified that error appears in the above-identified patent and that said Letters Patent is hereby corrected as shown below:

At column 18, claim number 7, lines 10-12 providing a thermosetting compound selected from cyanate ester, phthalonitrile, acetylene containing compound, and hydrosilating compound a mixture of a should be providing a mixture of a Signed and Sealed this
Fourth Day of December, 2012

David J. Kappos
*Director of the United States Patent and Trademark Office*